(12) United States Patent
Kocic (10) Patent No.: US 12,320,627 B2
(45) Date of Patent: Jun. 3, 2025

(54) JOGBOX WITH 3D SCANNER (71) Applicant: Hexagon Metrology, Inc., North Kingstown, RI (US)

(72) Inventor: Milan Kocic, Pawtucket, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 0 days.

(21) Appl. No.: 18/373,639

(22) Filed: Sep. 27, 2023

(65) Prior Publication Data

US 2024/0019241 A1 Jan. 18, 2024

Related U.S. Application Data (62) Division of application No. 16/706,288, filed on Dec. 6, 2019, now Pat. No. 11,802,760.

(60) Provisional application No. 62/776,115, filed on Dec. 6, 2018.

(51) Int. Cl.
  *G01B 11/00* (2006.01)
  *G01B 9/0209* (2022.01)
  *G01B 11/03* (2006.01)
  *G01B 21/04* (2006.01)
  *G06F 3/04883* (2022.01)

(52) U.S. Cl.
  CPC .......... *G01B 11/005* (2013.01); *G01B 9/0209* (2013.01); *G01B 11/03* (2013.01); *G01B 21/04* (2013.01); *G06F 3/04883* (2013.01); *G01B 2290/45* (2013.01)

(58) Field of Classification Search
  CPC .... G01B 11/005; G01B 9/0209; G01B 11/03; G01B 2290/45; G01B 2210/52; G01B 21/04; G06F 3/04883
  See application file for complete search history.

(56) References Cited

U.S. PATENT DOCUMENTS

| 6,158,136 A | 12/2000 | Gotz et al. |
| 6,366,831 B1 | 4/2002 | Raab |
| 6,741,906 B2 | 5/2004 | Walther et al. |
| 6,816,605 B2 | 11/2004 | Rowe et al. |
| 7,905,031 B1 | 3/2011 | Paulino |

(Continued)

FOREIGN PATENT DOCUMENTS

| CN | 101706268 A | 5/2010 |
| CN | 105606046 A | 5/2016 |

(Continued)

OTHER PUBLICATIONS

International Search Report and Written Opinion for Application No. PCT/US2019/065011 mailed Mar. 18, 2020 15 pages.

(Continued)

*Primary Examiner* — Michael P LaPage
(74) *Attorney, Agent, or Firm* — Nutter McClennen & Fish LLP (57) ABSTRACT

A method measures an object using a CMM having a CMM accuracy. To that end, the method provides a jogbox with a 3D scanner having a scanner accuracy, positions the object on the CMM, and scans, using the 3D scanner, the object to produce scan data of the object. The method also measures a first portion of the object using the scan data, and a second portion of the object using the CMM. The CMM accuracy is more accurate than the scanner accuracy.

9 Claims, 3 Drawing Sheets

(56) References Cited

U.S. PATENT DOCUMENTS

| | | |
|---|---|---|
| 8,352,212 B2 | 1/2013 | Fetter et al. |
| 8,581,855 B2 | 11/2013 | Spink et al. |
| 9,329,595 B2 | 5/2016 | Lankalapalli et al. |
| 9,429,416 B2 | 8/2016 | Kocic et al. |
| 10,086,273 B2 | 10/2018 | Jones et al. |
| 10,458,772 B2 | 10/2019 | Cobb et al. |
| 11,118,890 B2 | 9/2021 | Witkos |
| 2010/0039391 A1 | 2/2010 | Spink et al. |
| 2011/0119025 A1 | 5/2011 | Fetter et al. |
| 2011/0192042 A1 | 8/2011 | McMurtry et al. |
| 2012/0229662 A1 | 9/2012 | Lankalapalli et al. |
| 2014/0152805 A1* | 6/2014 | Saeki .............. G01B 21/047 348/94 |
| 2014/0168380 A1 | 6/2014 | Heidemann et al. |
| 2015/0052769 A1 | 2/2015 | Noda et al. |
| 2015/0085108 A1 | 3/2015 | Kaufman et al. |
| 2015/0345932 A1 | 12/2015 | Wakai |
| 2016/0084633 A1* | 3/2016 | Ferrari .............. G01B 5/008 |
| 2016/0327383 A1 | 11/2016 | Becker et al. |
| 2016/0341533 A1 | 11/2016 | Noda |
| 2017/0010087 A1 | 1/2017 | Polidor et al. |
| 2017/0188831 A1 | 7/2017 | Adler et al. |
| 2017/0211927 A1 | 7/2017 | Bridges et al. |
| 2018/0073850 A1* | 3/2018 | Ferrari .............. G01B 15/08 |
| 2018/0364033 A1* | 12/2018 | Doring .............. G03B 17/54 |
| 2018/0372480 A1 | 12/2018 | Hidaka et al. |
| 2019/0030425 A1 | 1/2019 | Jones et al. |
| 2019/0078867 A1 | 3/2019 | Noda |
| 2019/0094010 A1* | 3/2019 | Demiter .............. G01B 7/008 |
| 2019/0113335 A1* | 4/2019 | Satoyoshi .......... G01B 9/0209 |
| 2019/0145758 A1* | 5/2019 | Wilson ............ G01B 11/2513 356/610 |

FOREIGN PATENT DOCUMENTS

| | | |
|---|---|---|
| EP | 2154472 A2 | 2/2010 |
| EP | 2505959 A1 | 10/2012 |
| EP | 2722728 A1 | 4/2014 |
| EP | 3144632 A1 | 3/2017 |
| EP | 2614415 B1 | 8/2017 |
| WO | 2018/020215 A1 | 2/2018 |

OTHER PUBLICATIONS

Chinese Office Action for Chinese Patent Application No. 201980078802.5 dated Feb. 23, 2024 (30 pages).

Chinese Office Action for Chinese Patent Application No. 201980078802.5 dated Mar. 30, 2024 (14 pages).

* cited by examiner

JOGBOX WITH 3D SCANNER

RELATED APPLICATIONS

This application is a divisional application of U.S. nonprovisional patent application Ser. No. 16/706,288, filed Dec. 6, 2019 and titled "System and Method for Measuring Using Multiple Modalities" and naming Milan Kocic as inventor, which claims priority to U.S. provisional patent application Ser. No. 62/776,115, filed Dec. 6, 2018 and titled "Scanning Jogbox" and naming Milan Kocic as inventor. The disclosure of each of the foregoing is incorporated herein by reference, in its entirety.

FIELD OF THE INVENTION

The invention generally relates to coordinate measuring machines and, more particularly, the invention relates to the measurement process of coordinate measurement machines.

BACKGROUND OF THE INVENTION

Coordinate measuring machines (CMMs) are the gold standard for accurately measuring a wide variety of different types of workpieces. For example, CMMs can measure critical dimensions of aircraft engine components, car engine cylinders, surgical tools, and gun barrels. Precise and accurate measurements help ensure that their underlying systems, such as an aircraft in the case of aircraft components, operate as specified.

CMMs typically have a probe extending from an arm that is movable in up to six dimensions. Many CMMs also have an adjunct device, known as a "jog box," that enables an operator to control the CMM. For example, an operator may use a jogbox to precisely position the arm relative to an object being measured at the beginning of the measurement process.

SUMMARY OF VARIOUS EMBODIMENTS

In accordance with one embodiment of the invention, a method measures an object (e.g., a workpiece) using a CMM having a CMM accuracy. To that end, the method provides a jogbox with a 3D scanner having a scanner accuracy, positions the object on the CMM, and scans, using the 3D scanner, the object to produce scan data of the object. The method also measures a first portion of the object using the scan data, and a second portion of the object using the CMM. The CMM accuracy is more accurate than the scanner accuracy.

The method also may determine that the first portion is to be measured from the scan data, and determine that the second portion is to be measured using the CMM. Among other things, the scan data may include a point cloud representation of the object, or a portion of the object. The portion of the object may include less than that the entire portion of the object that is within the field of view of the scanner. Moreover, the 3D scanner may be at least one of a laser scanner and a white light scanner.

The method may measure the first portion by locating the first portion of the object as represented by the scan data, and virtually measuring that located first portion. In some embodiments, the scan accuracy is between about 50 and 200 microns and the CMM accuracy is between 1 and 10 microns. To determine error, the method may compare the measured values of the first and second portions against a nominal file.

The jogbox may include a joystick for controlling the CMM, and a touch-screen display for controlling the jog box and/or the CMM.

In accordance with another embodiment, a jogbox for use with a CMM has a housing, interface elements for controlling the CMM, and a 3D, non-contact scanner configured to scan an object. The housing at least in part contains the interface elements and the scanner.

The jogbox also may include a wireless interface configured to communicate with the CMM, and the interface elements may include a touchscreen display. Moreover, the CMM has a CMM accuracy and the scanner has a scanner accuracy. In that case, the CMM accuracy preferably is more accurate than the scanner accuracy.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a jogbox has the functionality to cooperate with a coordinate measuring machine ("CMM") to contribute to scanning and measurement processes. To that end, the jogbox includes an image device, such as a scanner, that at least in part can manually scan an object (e.g., a workpiece) before, during, or after its associated CMM measures that same object. A measurement package can use images from the jogbox to measure some portions of the object (e.g., portions that do not require fine measurements), while the measurement package can use data from the CMM to measure other portions of the object (e.g., portions requiring fine measurement). Details of illustrative embodiments are discussed below.

Definitions: As used in this description and the accompanying claims, the following terms shall have the meanings indicated, unless the context otherwise requires.

A "nominal file" is data file including nominal physical dimensions of an object or workpiece. A nominal file can be used in determining deviation of the physical dimensions of an actual object or workpiece (e.g., as measured) from the nominal physical dimensions of that object or workpiece. A nominal file may be a design file of the object from a computer-aided design (CAD) system, or a file created based on measurements of an exemplar of the object, to name but a few examples.

A "optical scanner" is a device configured to capture an optical image of an object, where the optical image includes an array of a plurality of data points. A scanner includes, but is not limited to, devices configured to capture images in spectra visible to the human eye, and includes devices configured to capture images in spectra not visible to the human eye, such as infrared images, to name but one illustrative example.

Figure 1:
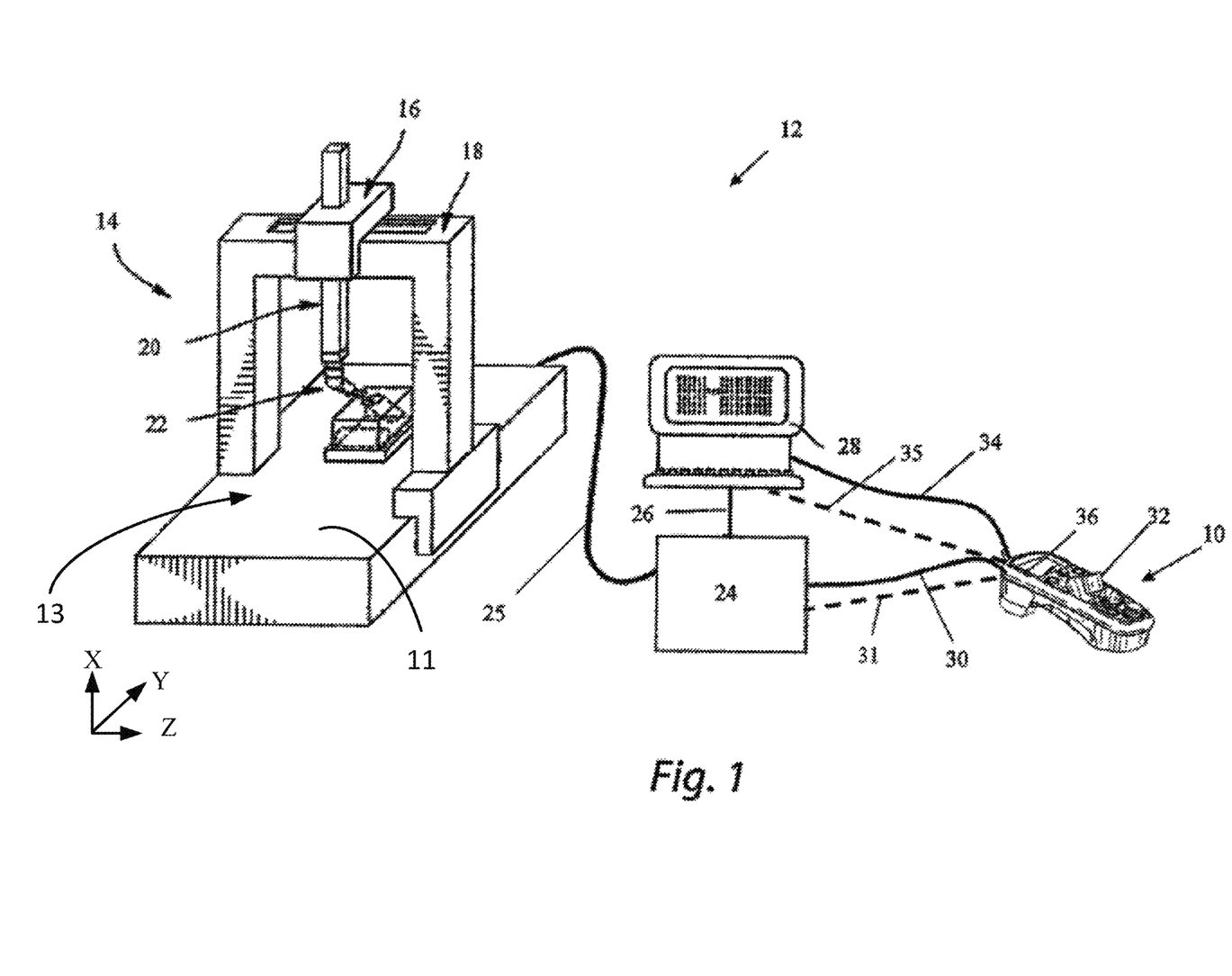
FIG. 1 schematically shows a CMM system that may be configured in accordance with illustrative embodiments of the invention.

FIG. 1 schematically shows one embodiment of a CMM system 12 having a coordinate measuring machine 14 ("CMM 14") and a jogbox 10 with enhanced functionality, such as scanning functionality. In this illustrative embodiment, the coordinate measuring machine 14 has a table 11. The table 11 is configured to hold an object while the object is measured by the CMM 14 and/or scanned by a scanner. The table 11 also defines a boundary of a 3D measuring space (or "measuring volume," or "measuring envelope") 13 above the table 11.

The coordinate measuring machine 14 includes movable features including a movable portion, including a carriage 16, a bridge 18 and a Z-ram 20, for moving an articulating probe 22 in the X, Y and Z directions respectively.

The movable features of the CMM 100 are configured to move and orient the articulating probe 22 relative to an object on the CMM 14 (e.g., in the measuring space 13) in one dimension (X-axis; Y-axis; or Z-axis), two dimensions (X-Y plane; X-Z plane; or Y-Z plane), or three dimensions (a volume defined by the X-axis, Y-axis, and Z-axis). Accordingly, the CMM 100 is configured to measure, with the articulating probe 22, the precise location of one or more features of the object.

Because their relative positions are determined by the action of the movable features of the CMM 14, the CMM 14 may be considered as having knowledge of the relative locations of the table 11 and the workpiece. More particularly, the computer 28 and/or controller 24 control store information about the motions of the movable features. Alternately, or in addition, the movable features of some embodiments include sensors that sense the locations of the table 11 and/or the articulating probe 22, and report that data to the computer 28 and/or controller 24. The information about the motion and positions of the table 11 and/or the articulating probe 22 of the CMM 14 may be recorded in terms of one-dimension (e.g., X, Y, or Z), two-dimensions (e.g., X-Y; X-Z; or Y-Z) or three-dimensions (X-Y-Z) of coordinate system referenced to a point on the CMM 14.

To control the CMM 14, a coordinate measuring machine controller 24 operatively couples to actuators of the carriage 16, the bridge 18, and the Z-ram 20 via a cable 25 or other means (e.g., wirelessly). As the controller 24 receives coordinate measurement data from the CMM 14, it sends the data via a connection 26 to a computer 28 configured to execute a dimensional metrology application (e.g., a measuring platform, such as PC-DMIS, distributed by Hexagon Metrology, Inc.). The dimensional metrology application may analyze the data and, in some embodiments, determine additional desired measurements. In addition, the dimensional metrology application may provide corresponding control commands to controller 24.

The jogbox 10 may be used to manually control the CMM 14. Manual control may be used, for example, to establish an initial positioning of a work piece/object to be measured, to develop part programs, or to place the probe 22 in a safe position when securing or removing the work piece/object.

The jog box may have a joystick 32 that generates and sends signals to the controller 24, causing controlled probe movement. The jog box 10 may be operatively connected to the coordinate measuring machine controller 24 with a communications cable 30 and/or with a wireless connection 31 (e.g., a Wi-Fi or RF connection). It should be noted that while FIG. 1 shows the CMM 14 as a bridge-type CMM 14, those skilled in the art recognize that illustrative embodiments may be used with other types of coordinate measuring machines. For example, some embodiments contemplate use with a cantilever coordinate measuring machine. Also, an articulating probe 22 is not required as the CMM 14 may use any of a variety of other suitable probes 22 (e.g., contact or non-contact probes).

In illustrative embodiments, the jogbox 10 sends signals to the computer 28 to control the dimensional metrology application executed on the computer 28. The dimensional metrology application preferably sends signals or control programs to the controller 24. Those signals and/or control programs instruct the controller 24 to move the probe 22 (in response to signals received by the dimensional metrology application from the jogbox 10) through communications cable 34 and/or wireless connection 35. In a manner similar to the connection between the jogbox 10 and the controller 24, the communications cable 34 may be a dedicated cable used solely for communication between jogbox 10 and the dimensional metrology application executing on computer 28. In other embodiments, communications cable 34 may be configured to communicate with other software, firmware and/or hardware of computer 28 and/or to communicate with controller 24 through computer 28.

The computer 28 may send measurement data or other information to jogbox 10 (e.g., directly or via controller 24). To enhance the user experience, the jogbox 10 may include a display screen 36. In illustrative embodiments, the display screen 36 acts as a user interface and a mechanism for graphically displaying helpful information to the user. To those ends, the display screen 36 may include a simple non-interactive display (e.g., an LED display), or a touch screen that enables the user to control the jogbox 10 and/or the CMM 14. The latter embodiment thus may present as a customized graphical user interface element for the metrology application. As such, the user may input data by touching the area of the touch screen associated with one or more interface elements. Among other things, the touch screen implementation may include one or more separate elements overlaying the display screen 36, may be attached to the display screen 36, may be integral with the display screen 36, or may be otherwise associated with the screen 36.

The dimensional metrology application is permitted to control graphics display on a portion or all of a display screen 36 of jogbox 10. For purposes herein, the term "graphic" encompasses not only drawings, figures, icons, etc., but also alpha-numeric text. The graphics may include information from the dimensional metrology application and/or represent a virtual interface element to accept inputs to the dimensional metrology application from the jogbox 10.

Figure 2A:
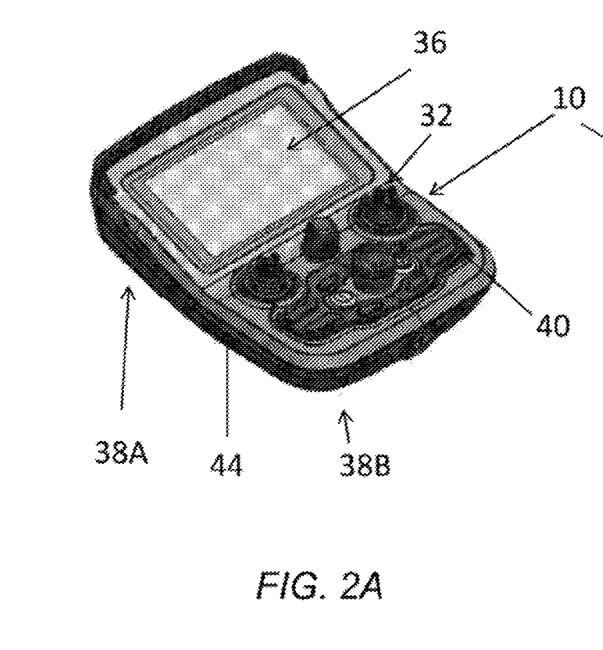
FIG. 2A and FIG. 2B schematically show different perspective views of an embodiment of a jogbox configured in accordance with illustrative embodiments of the invention.
Figure 2B:
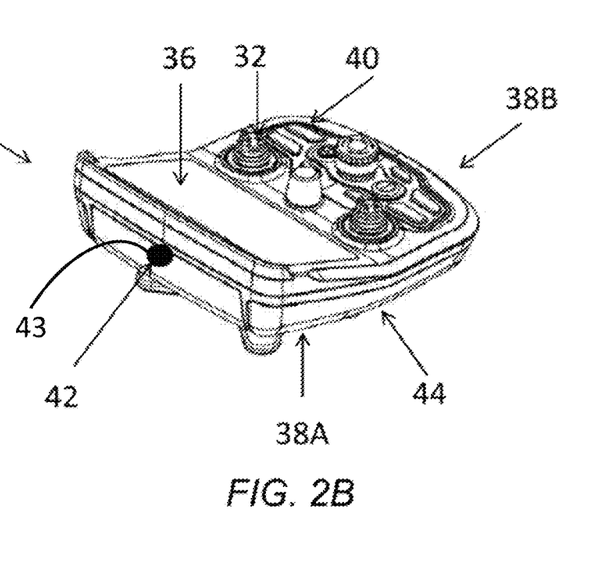

FIGS. 2A and 2B schematically show two perspective views of the noted jogbox 10 configured in accordance with illustrative embodiments of the invention. These views show the jogbox 10 as having a body with a lower portion 38A having a plurality of hand controls, and a raised portion 38B having the display screen 36. The hand controls preferably are positioned so that they are accessible by the thumbs of a typical user holding the device with both hands. Among other things, exemplary arrangement of FIGS. 2A and 2B shows a plurality of hand controls, such as the prior noted joysticks 32, as well as buttons 40, knobs, etc. Those skilled in the art may arrange the various hand controls, as well as the one or more display screens 36, in any of a variety of manners and thus, the arrangement of those elements in the figures is exemplary.

Figure 2C:
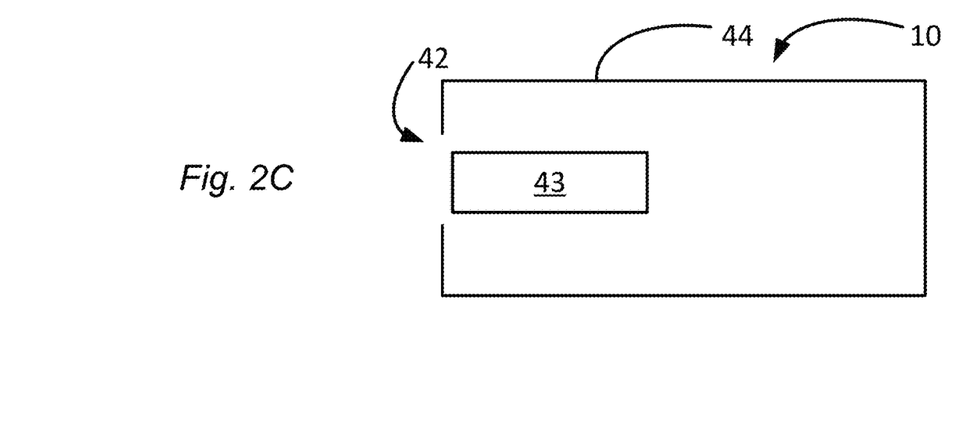
FIG. 2C schematically illustrates a cross-section of an embodiment of a jogbox configured in accordance with illustrative embodiments.

In accordance with illustrative embodiments, the jogbox 10 has a built-in scanner 43 at least partly within a protective housing 44. Preferably, the scanner may include non-contact, 3D scanning capabilities. In some embodiments, the scanner 43 may be described as being an optical scanner. To that end, the housing 44 includes an aperture 42 (FIG. 2B; FIG. 2C) to permit light and/or other electromagnetic signals (e.g., infrared; laser light) to pass into the remaining scanning apparatus within the housing 44. Those skilled in the art can implement the scanner in a variety of different manners in accordance with different conventional technologies. For example, the scanner can implement white-light scanning and/or laser scanning. In fact, the jogbox 10 can have multiple different scanning modalities 43 in a single housing 44.

In illustrative embodiments, the scanner 43 has less measurement accuracy than that of the CMM 14. For example, the scanner 43 may have 50 to 200-micron accuracy, while the CMM 14 may have 1-10 micron accuracy . . . or to the sub-micron level. Other embodiments, however, may have respective scanner 43 and CMM accuracies that are different than those examples, and closer to each other. As discussed below, these different accuracies can enable a more rapid and less costly measurement. Specifically, one may scan more rapidly with the jogbox scanner 43 than measuring using the CMM 14, thus increasing metrology throughput.

Illustrative embodiments also allow measurement of a workpiece, or a portion of a workpiece, for which it is difficult, impractical, or impossible to measure with an articulating probe 22. For example, such embodiments enable measurement, by scanner 43, of a portion of a workpiece, which portion is deep within a recess, or is made unreachable by an articulating probe 22 by another part of the workpiece or CMM 14, or otherwise unreachable an articulating probe 22. As another example, such embodiments enable measurement, by scanner 43, of a portion of a workpiece, that is too delicate to be measured by an articulating probe 43.

Illustrative embodiments also allow efficient measurement, or re-measurement, of workpiece, or portion of a workpiece, that has been previously measured. For example, a CMM may measure a workpiece, but data from that measurement may be lost or corrupted, for example due to a computer malfunction. Rather than re-measure the entire workpiece, or a portion of the workpiece previously measured by the CMM, a portion of the workpiece may be remeasured instead, more quickly and efficiently, by the jogbox scanner 43, and the measurement data produced by the jogbox scanner 43 may be used to replace, or supplement, date from the previous measurement.

As shown, the jogbox 10 preferably is portable, e.g., movable relative to the CMM 14. This embodiment of FIGS. 2A and 2B is a handheld version in which an average person can hold it entirely in his/her hand(s), completely supporting the weight of the jogbox 10 without duress. As such, the jogbox 10 is designed to be operated while being held entirely one of a single person's hands. This is in contrast to a non-hand-held version, which may be coupled to or part of a console or larger apparatus and, despite being able to be held by a person's hands to some extent, is designed to be supported by a solid foundation (e.g., the floor or CMM body).

Figure 3A:
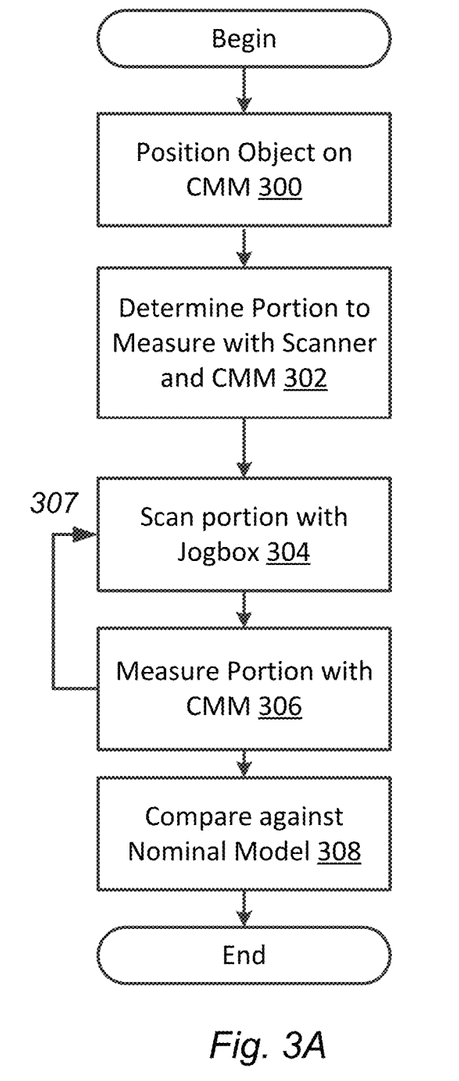
FIG. 3A shows a process of using the jogbox in accordance with illustrative embodiments of the invention.

FIG. 3A shows a process of using the CMM and jogbox 10 of FIGS. 1, 2A and 2B to measure an object in accordance with illustrative embodiments of the invention. It should be noted that this process is substantially simplified from a longer process that may be used to measure the object. Accordingly, the process of measuring the object can have many steps, such as calibration and post-measurement steps, which those skilled in the art likely would use. In addition, some of the steps may be performed in a different order than that shown, or at the same time. Those skilled in the art therefore can modify the process as appropriate.

The process begins at step 300, which positions an object on the CMM 14. The object may be placed directly on the flat platform of the CMM 14, or on a rotating device, such as a rotary table (not shown) supported by that noted flat CMM surface.

Next, step 302 determines which portion of the object to measure with the CMM 14, and which portion to measure with the scanner of the jogbox 10. To that end, logic or a user may enter data indicating which portion of the object to measure with each modality. For example, some portions of the object may not require highly precise and accurate measurements/dimensions. In that case, the jogbox scanner may be used to scan those portions. Other portions, however, may require highly precise and more accurate measurements. As such, the CMM 14 may measure those other portions.

Some embodiments may redundantly measure the same portions using both modalities. Other embodiments may use the scanner for other purposes, such as to lay out a preliminary measurement path for the probe 22 of the CMM 14. Those skilled in the art may use the scanner and CMM modalities for other purposes. Accordingly, discussion of measuring one portion with the scanner and the other portion with the CMM 14 is but one example and not intended to limit various embodiments.

Using the jogbox 10, the user may then may scan the object at step 304. Among other ways, the user may manually move the jogbox 10 about the object to scan a specific portion of the object. Alternatively, the user may scan the entire object with the jogbox 10. For example, if the object is positioned on the noted rotary table, which rotates the object 360 degrees, the user may scan from a single position. As another example, if the object is positioned on the flat surface of the CMM 14 (i.e., in a stationary manner), then the user may move the jogbox 10 around the object to scan some or all of it. To further stabilize the jogbox 10, some embodiments may secure it to a stationary item while it scans the object. In some embodiments, the scan may produce a point cloud representing the portion of interest. The portion of interest include less than that the entire portion of the object that is within the field of view of the scanner 43.

Next, the CMM 14 may measure a portion of the object using conventional CMM technologies, at step 306. In the example noted above, the CMM 14 measures a different portion of the object than that of the scanner 43. It should be noted that the two "different portions" may physically overlap. Specifically, the different portions mentioned above and below simply refer to taking separate measurements of the object from different points/geometries. For example, the scanner 43 may scan the top surface of a cube, while the CMM 14 may measure some dimension of the same top surface (e.g., from one side to another opposite side). As discussed below, the scan data may be used to measure the distance from one of the prior mentioned sides of that same top surface to a visible feature on that surface. As such, these overlapping distances are considered different portions for measurement and scanning purposes.

Some embodiments include step 307, which determines whether step 304 should be repeated, for example for a portion of the object that was not scanned by the scanner in the previous execution of step 304, or a portion of the object that was scanned by the scanner in the previous execution of step 304. Step 307 may make that determination, for example, if a previous execution of step 304 failed to acquire scan data, and/or if previously-acquired scan data is lost, corrupted, or otherwise unavailable for subject use. If so determined, the process loops back to step 304 to execute or re-execute the scan using the scanner 43.

The process concludes at step 308 by comparing the scanned portion and the portion measured by the CMM 14 against a nominal model of the object. Among other things, the nominal model may include the computer aided design model ("CAD model"). To that end, for the scanned data, illustrative embodiments may virtually measure the desired portion of the point cloud, and then compare those measured portion(s) against the nominal model to determine the accuracy of the scanned portions of the object. In a similar manner, the CMM measurement may be compared against the CAD model to determine the accuracy of the portion scanned by the CMM 14. Some embodiments include, in or prior to step 308, reconciling the scan data acquired at step 304 with the data acquired by the CMM 14 in step 306. Reconciling is described further below in connection with FIG. 3B.

Users or logic may use this accuracy information to approve or reject the object, and identify a problem with the object manufacturing process for subsequent correction.

Accordingly, unlike conventional technology known to the inventors, the jogbox 10 of illustrative embodiments is more than merely a way to move the probe 22. Instead, the jogbox 10 has enhanced functionality to speed up and otherwise enhance and supplement the core process of the CMM 14 itself. For example, the jogbox 10 can eliminate the need for the CMM 14 to measure features that require less accuracy and instead, permits the CMM 14 to do what it is primarily designed for, which is to measure critical features that require high accuracy readings.

Figure 3B:
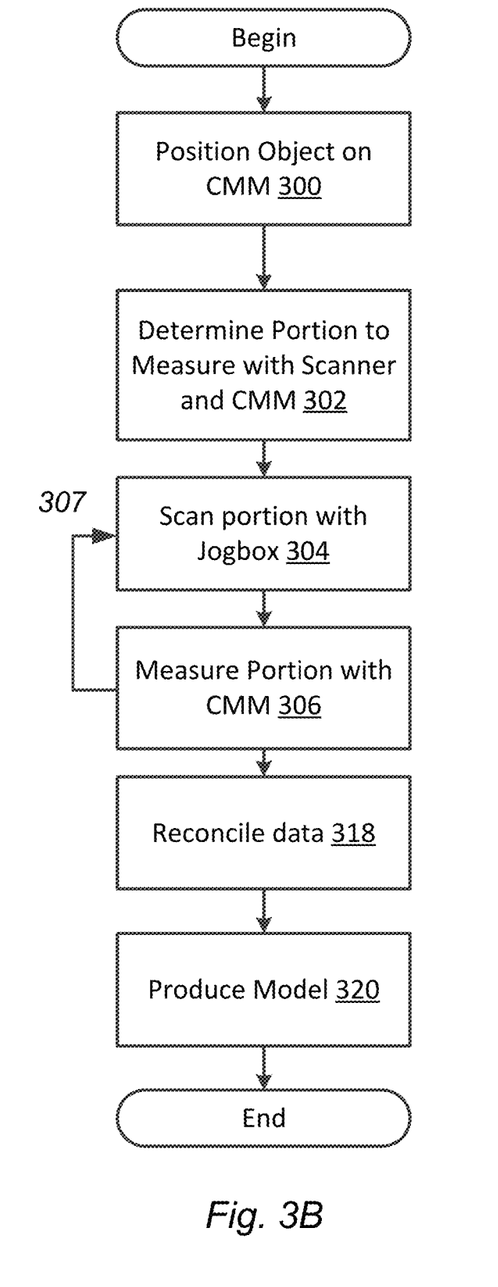
FIG. 3B shows a process of using the jogbox in accordance with other illustrative embodiments of the invention.

FIG. 3B is a flowchart that shows an embodiment of another process of using the CMM and jogbox 10. The process (or method) of FIG. 3B enables creation of a virtual model of an object based on the object, or an exemplar of that object. For example, the object may be an object for which there is no available CAD file or engineering drawing, such a production workpiece; a recently-discovered archeological artefact, an old product, or a competitor's new product, to name but a few examples. The process of FIG. 3B allows a CMM operator to produce drawings of such an object.

Step 300 is as described above.

Next, step 302 determines which portion of the object to measure with the CMM 14, and which portion to measure with the scanner 43 of the jogbox 10, as described above. In some embodiments, the entire surface of the object, or at least the surface of the object that is not in contact with the CMMs table 11, is measured by at least one of the CMM 14 and the jogbox 10.

Step 304 and step 306, and step 307 proceed as described above. Because the jogbox 10 (and its scanner 43) is movable relative to the CMM, step 304 may also include moving the jogbox 10 into a position relative to the object, and using the 3D scanner at the position, scanning the object to produce scan data of the object.

Because the scanner 43 is movable with respect to the CMM, the scan data captured by the scanner 43 may have a frame of reference that is different from the X-Y-Z coordinate system of the CMM 14. For example, a feature of the object that appears (e.g., and is measured as being) at coordinate X1, Y1, Z1 in the X-Y-Z coordinate system of the CMM 14 may appear at (e.g., and be measured as being at) coordinate J1, J2, J3 with respect to the jogbox, where J1 is not the same at X1, J2 is note the same as X2, and J3 is not the same as X3. Moreover, the scan data produced by the scanner 43 may be on a different scale than measurements made by the articulated probe 22 of the CMM 14.

Consequently, some embodiments include and benefit from reconciling the scan data (produced by the scanner 43) and the data produced by the CMM 14 to a common coordinate system, at step 318. For example, some embodiments reconcile the scan data (produced by the scanner 43) to the coordinate system of the CMM 14, to produce reconciled scan data. Reconciled scan data thus shares a common frame of reference (the common X, Y, Z coordinate system) with the data produced by the CMM 14.

Such a reconciliation may be performed by a best-fit analysis as known in the art, by which the scan data representing a portion of the object is matched to corresponding portion in a nominal file for the object, or to a portion of data produced by the CMM 14. One a fit is identified, the coordinates of the scan data may be adjusted so that the (now reconciled) scan data is referenced to the CMM coordinate system. Such a reconciliation may also include, alone or in addition to best fit analysis, a scaling, rotation, or other adjustment of the scan data. For example, such adjustment may include an affine transformation or a non-affine transformation.

Once the scan data and the data produced by the CMM 14 are both referenced to the same coordinate system (e.g., the CMM coordinate system), the scan data and the data produced by the CMM 14 is combined, at step 320, to produce a virtual model of the measured object. In some limitations, that virtual model may be a used as a nominal file for the assessments of future objects of the type for which the measured object is an exemplar.

A LISTING OF CERTAIN REFERENCE NUMBERS IS PRESENTED BELOW

10: Jogbox;
11: CMM table;
12: CMM system;
13: CMM measuring envelope;
14: CMM;
16: CMM carriage;
18: CMM bridge;
20: CMM Z-Ram;
22: Articulating probe;
24: CMM controller;
25: Cable;
26: Connection;
28: Computer;
30: Jogbox-controller cable;
31: Jogbox-controller wireless connection;
32: Joystick;
34: Jogbox-computer cable;
35: Jogbox-computer wireless connection;
36: Jogbox display screen;

38A: Lower portion of jogbox;
38B: Upper portion of jogbox;
40: Jogbox controls (buttons, knobs etc.);
42: Scanner aperture;
43: Scanning modality (or "scanner");
44: Jogbox housing.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method of measuring an object using a CMM having a CMM accuracy, the object having a plurality of portions, the method comprising: providing a jogbox with a 3D scanner having a scanner accuracy; positioning the object on the CMM; using the 3D scanner, scanning the object to produce scan data of the object; measuring a first portion of the object using the scan data; and measuring a second portion of the object using the CMM, the CMM accuracy being more accurate than the scanner accuracy.

P2. The method as defined by P1 further comprising determining that the first portion is to be measured from the scan data; and determining that the second portion is to be measured using the CMM.

P3. The method as defined by any one of P1-P2 wherein the scan data comprises a point cloud representation of the object.

P4. The method as defined by any one of P1-P3 wherein the 3D scanner comprises at least one of a laser scanner and a white light scanner.

P5. The method as defined by any one of P1-P4 wherein measuring the first portion comprises locating the first portion of the object as represented by the scan data, and virtually measuring that located first portion.

P6. The method as defined by any one of P1-P5 wherein the scan accuracy is between about 50 and 200 microns and the CMM accuracy is between 1 and 10 microns.

P7. The method as defined by any one of P1-P6 wherein the jogbox includes a joystick for controlling the CMM, and a touch-screen display for controlling the jogbox and/or the CMM.

P8. The method as defined by any one of P1-P7 further comprising comparing the measured values of the first and second portions against a nominal file to determine error.

P9. A jogbox for use with a CMM, the jogbox comprising: a housing; interface elements for controlling the CMM; and a 3D, non-contact scanner configured to scan an object, the housing at least in part containing the interface elements and the scanner.

P10. The jogbox as defined by P9 further comprising a wireless interface configured to communicate with the CMM.

P11. The jogbox as defined by any one of P9-P10 wherein the interface elements include a touchscreen display.

P12. The jogbox as defined by any one of P9-P11 wherein the CMM has a CMM accuracy and the scanner has a scanner accuracy, the CMM accuracy being more accurate than the scanner accuracy.

P13. A method of producing a virtual model of an exemplar of an object using a coordinate measuring machine ("CMM") having CMM coordinate system, a CMM probe and a CMM accuracy, the object having a plurality of portions, the method comprising:
providing a jogbox with a 3D scanner, the scanner being distinct from the CMM probe, the jogbox being movable relative to the CMM;
positioning the object on the CMM;
moving the jogbox into a position relative to the object;
using the 3D scanner at the position, scanning the object to produce scan data of the object;
reconciling the scan data to the CMM coordinate system to produce reconciled scan data referenced to the CMM coordinate system;
measuring a first portion of the object using the scan data to produce first measured values referenced to the CMM coordinate system;
measuring a second portion of the object using the CMM probe to produce second measured values, the second portion being different from the first portion; and
combining the reconciled scan data and the first measured values to produce a virtual model of the object.

P14. A method of P13, wherein the 3D scanner has a scanner accuracy, the scanner accuracy being less than the CMM accuracy.

P21: A system for measuring an object, the system comprising:
a coordinate measuring machine having an articulating probe, the coordinate measuring machine defining a measurement volume having mutually orthogonal X, Y, and Z axes, the coordinate measuring machine configured to produce, with the articulating probe, probed data of at least a first portion of an object within the measurement volume;
a jogbox having a 3D scanner, the scanner being distinct from the articulating probe, the jog box being movable relative to the coordinate measuring machine, the jogbox configured to produce, with the scanner, scan data of at least a second portion of the object;
a processor configured to receive the probed data produced by the articulating probe, and to receive the scan data produced by the scanner, and configured to measure the first portion of the object and the second portion of the object using the received probed data and the received scanned date.

P22: The system of P21 wherein the first portion of the object and the second portion of the object overlap.

P23: The system of P21 wherein the first portion of the object and the second portion of the object do not overlap.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above)

may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A jogbox for use with a coordinate measuring machine ("CMM"), the coordinate measuring machine having a measuring volume and a controller in control communication with a contact probe, which contact probe is movable with respect to the measuring volume under control of the controller, the jogbox comprising:
   a housing;
   interface elements configured to control motion of the contact probe via communication with the controller; and
   a 3D, non-contact scanner configured to scan an object, the housing at least in part containing the interface elements and the 3D non-contact scanner, the jogbox configured to be movably coupled to the coordinate measuring machine and independently movable relative to the contact probe.

2. The jogbox as defined by claim 1 further comprising a wireless interface configured to communicate with the CMM.

3. The jogbox as defined by claim 1 wherein the interface elements include a touchscreen display.

4. The jogbox as defined by claim 1 wherein the CMM has a CMM accuracy and the 3D non-contact scanner has a scanner accuracy, the CMM accuracy being more accurate than the 3D non-contact scanner accuracy.

5. The jogbox as defined by claim 1, wherein the CMM comprises a CMM probe, and has a CMM accuracy, and defines a CMM coordinate system, and wherein:
   the 3D non-contact scanner of the jogbox is configured to produce scan data of a first portion of the object; and
   the jogbox is configured to be in data communication with the CMM to send to the CMM the scan data of the first portion of the object.

6. The jogbox as defined by claim 5, wherein the scan data comprises a point cloud representation of the portion of the object.

7. The jogbox as defined by claim 1, wherein the 3D non-contact scanner comprises a laser scanner.

8. The jogbox as defined by claim 1 wherein, the 3D non-contact scanner comprises a white light scanner.

9. The jogbox as defined by claim 1, wherein the CMM defines a CMM coordinate system, and wherein:
   the 3D non-contact scanner has a scanner frame of reference that is different from the coordinate system of the CMM, and the scan data can be reconciled with data produced by a measurement probe of the CMM to produce reconciled scan data, the reconciled scan data sharing a common frame of reference with the data produced by the measurement probe of the CMM.

* * * * *